(12) United States Patent
Klein et al.

(10) Patent No.: US 7,815,054 B2
(45) Date of Patent: Oct. 19, 2010

(54) FILTER DEVICE

(75) Inventors: Volkmar Klein, Zweibrücken (DE); Nobert Sann, Riegelsberg (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 160 days.

(21) Appl. No.: 10/589,964

(22) PCT Filed: Sep. 29, 2004

(86) PCT No.: PCT/EP2004/010868
§ 371 (c)(1),
(2), (4) Date: Aug. 18, 2006

(87) PCT Pub. No.: WO2005/089899
PCT Pub. Date: Sep. 29, 2005

(65) Prior Publication Data
US 2007/0131606 A1    Jun. 14, 2007

(30) Foreign Application Priority Data
Feb. 18, 2004  (DE) .................. 10 2004 008 879

(51) Int. Cl.
*B01D 35/157* (2006.01)
*B01D 35/00* (2006.01)
(52) U.S. Cl. .................. 210/418; 210/234; 210/238; 210/443
(58) Field of Classification Search .............. None
See application file for complete search history.

(56) References Cited
U.S. PATENT DOCUMENTS 2,354,238 A    7/1944  Wilkinson
2,991,885 A *  7/1961  Gutkowski ................. 210/133
3,982,520 A *  9/1976  Wheeler ................. 123/196 A
4,529,515 A *  7/1985  Selz ........................ 210/234
5,256,285 A * 10/1993  Tomita et al. ............... 210/234
5,607,582 A *  3/1997  Yamazaki et al. ........... 210/234
6,485,635 B1* 11/2002  Gandini et al. .............. 210/117
6,579,455 B1*  6/2003  Muzik et al. ................ 210/234
2003/0222008 A1  12/2003  Nightlinger et al.

FOREIGN PATENT DOCUMENTS

| DE | 31 00 499 | 8/1982 |
| DE | 3100499 A1 * | 8/1982 |
| DE | 199 17 031 | 5/2000 |
| EP | 0 492 627 | 7/1992 |

* cited by examiner

Primary Examiner—Krishnan S Menon
Assistant Examiner—Madeline Gonzalez
(74) Attorney, Agent, or Firm—Roylance, Abrams, Berdo & Goodman, LLP

(57) ABSTRACT

A filter device includes at least one filter element (10) housed in a filter housing (22) and connected for the flow of fluid by fluid connections (30, 36) to a fluid device, in particular in the form of a hydraulic tank (40), using a connector device (44). A plunger valve arrangement is achieved, whereby the connector device (44) is provided with at least one longitudinally-displaceable blocking piece (46). In the blocking position, the blocking piece blocks the provided fluid connections (30, 36). After displacement into an open position, it releases the fluid connections. A blocking or releasing of the fluid connections in a rapid operation process is permitted to carry out a filter element exchange for the used filter medium.

15 Claims, 3 Drawing Sheets

FILTER DEVICE

FIELD OF THE INVENTION

The present invention relates to a filter device with at least one filter element held in a filter housing, connected to carry fluid by fluid connections to a fluid means, especially in the form of a hydraulic tank, by a connecting device.

BACKGROUND OF THE INVENTION

These filter devices are readily available on the market in a plurality of designs and versions. Among their functions is to filter dirt in fluids, such as hydraulic oil, out of these fluids. Hydraulic oil is fouled during installation and when the respective hydraulic system is started up. In addition to this initial fouling, fouling during operation can occur, for example by penetration of dirt at the hydraulic tank due to inadequate tank ventilation, pipe penetrations, piston rod seals, and the like. To the extent fouling within the fluid stored in the hydraulic tank occurs in hydraulic systems of machines such as earth moving machines, excavators or the like, it can be advantageous to implement filtration directly in the area of the hydraulic tank, for example by attaching the filter device directly to the tank. The hydraulic oil removed from the tank is delivered directly to a filter element to filter out dirt which filter element is held in the filter housing. The fluid which has been cleaned in this way then returns again to the tank by the filter housing. Here add-on solutions are known in which the filter device cleans only the contents of the tank. Solutions are also conceivable in which the filter device delivers the correspondingly filtered and cleaned fluid to the hydraulic circuit of the machine, in order from there to return to the tank the fluid fouled with solid particles in the pertinent circulation in the hydraulic circuit.

Where the filter device filters only the contents of the tank, fluid is removed from the tank, filtered and then returned again to the tank. To avoid interruptions in the operation of the respective hydraulic system, the contents of the fluid means, especially in the form of a hydraulic tank, is advantageously blocked off relative to the filter housing to replace a fouled and used filter element by a new one, or for changing this filter element to completely dismount the filter housing with the used filter element from the fluid means in the form of the tank. After appropriate maintenance of the unit of the filter housing with the filter element, especially by replacement of the used filter element by a new one, this unit can be re-connected to the fluid means for use. It is also possible to connect a new unit of the filter housing with the unused filter element to the fluid means, while in the other dismounted unit the filter element is changed. For this reason, in the known solutions the pipes must be separated from each other in a complicated manner, sealed, and by complex rotary slide valve parts, the fluid connection between the fluid means (tank) and the filter housing with the filter element must be separated and later re-connected. The rotary slide valve parts, as a component of a connecting means between the filter housing and the fluid means, are not only expensive to produce and complicated to maintain, but also entail the danger that correspondingly large amounts of fluid will emerge from the fluid means as a leaking oil flow. This leakage leads to fouling problems in the vicinity. These solutions are also prone to failure in operation. In this regard, they are less reliable, since an operator often has problems at the assumed position of the rotary slide valve parts in recognizing whether they are in their blocking or in their open position.

SUMMARY OF THE INVENTION

An object of the present invention is to provide an improved filter device meeting the above described requirements for their operation in a space-saving and reliable manner with low production, installation and maintenance costs.

This object is achieved by a filter device having connecting means provided with at least one longitudinally displaceable blocking part which blocks the fluid connection in a blocking position. After displacement into the open position, the fluid connection is cleared. A blocking slide valve is implemented making it possible to block or clear the fluid connections with only a brief actuation process to change the filter element for the used filter medium and to re-use the filter element stored in the filter housing for the filtration tasks under consideration. Since it can be seen from the outside, the operating position of the blocking slide valve is also evident to an operator, which operating position the filter device currently assumes. Based on the configuration of the blocking part as a longitudinally displaceable blocking slide valve, it requires little installation space and can be easily used for cramped installation conditions. The linear displacement motion of the blocking part can be mechanically controlled easily and effectively. This arrangement helps reduce the production, installation and maintenance costs. Operation of the connecting device as the blocking and clearance means, even under difficult ambient conditions, is achieved.

With the filter device of the present invention, it is possible to separate the unit formed from the filter element and the filter housing from the remaining fluid means in a fluid-tight manner, in order to replace the used filter element with a new one on site, that is to say, on the fluid means. By preference, the possibility also exists of completely removing this unit from the fluid means, and to replace the element elsewhere. Then additional maintenance operations can be carried out. The change of the element takes only seconds. With the present invention, it is also ensured that fluid (oil) cannot escape to the exterior, leading to environmental pollution.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
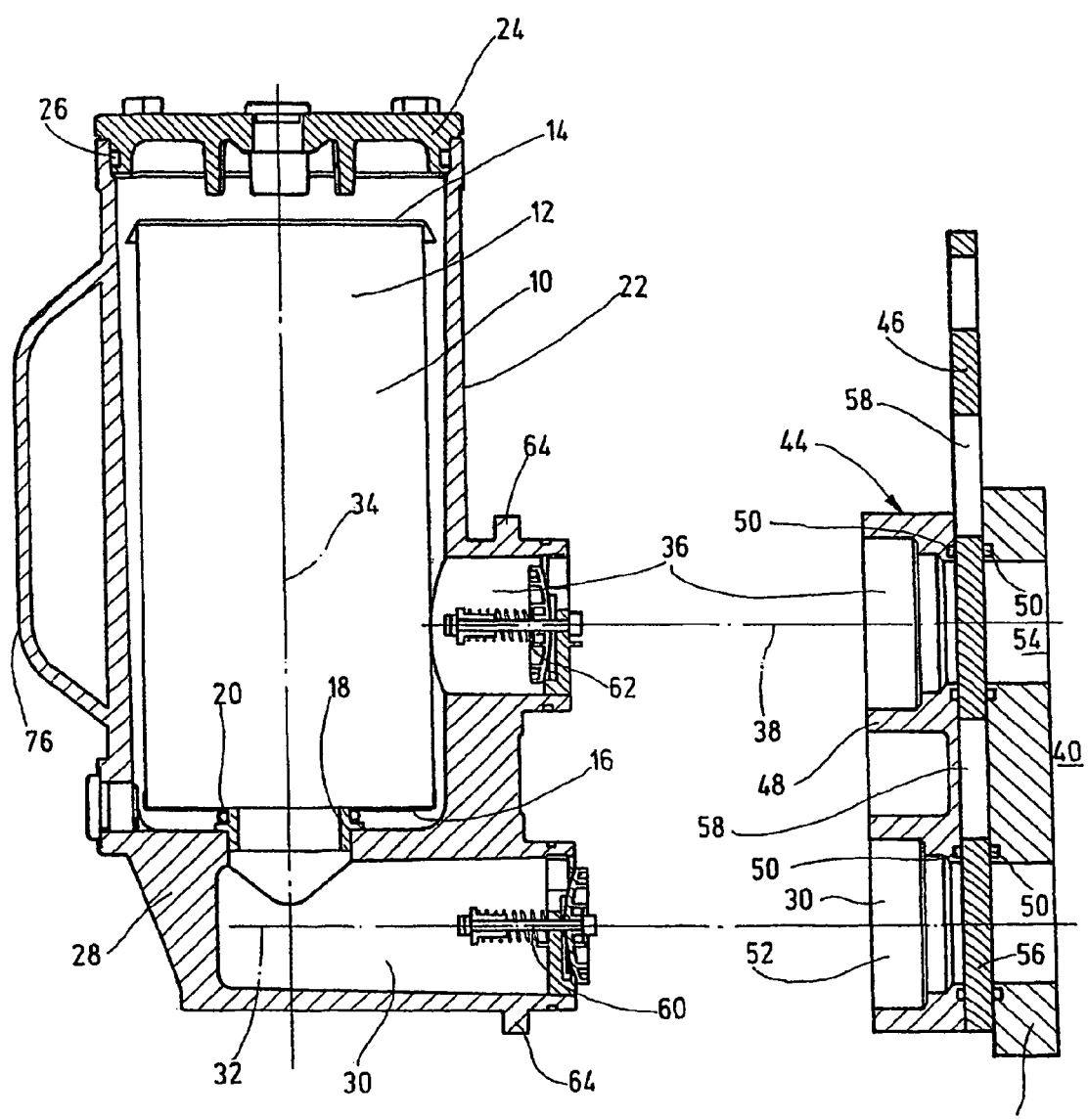
FIG. 1 is a side elevational view in section of the important components of a filter device, with the filter housing and filter element being separated from the fluid means according to an embodiment of the present invention.

The filter device shown in the figures has a cylindrical filter element 10 of conventional design. The filter element 10 is used to filter dirt, especially in the form of solid particles, out of a fluid flow, such as a hydraulic medium. For this purpose, the filter element 10 is provided with a preferably pleated filter mat 12 supported on the interior on a perforated support tube (not shown). Furthermore, the filter mat 12 is cylindrical, and held between two end caps 14, 16. This element structure is conventional and prior art, so that it will not be described further. The upper end cap 14 can be equipped with a bypass means, for example a bypass valve (not shown) to ensure that when the filter element 10 is clogged with dirt the fluid flow can freely pass the filter element 10 via the end caps 14, 16 to avoid obstacles in operation of a fluid or hydraulic system. The lower end cap 16, as viewed in FIG. 1, is held along one cylindrical mounting connection piece 18, and is sealed via a gasket 20 against the latter.

The filter element 10 can be held in a cylindrical filter housing 22 by the mounting connection piece 18. To replace the fouled filter element 10 with a new filter element 10, the filter housing 22 on its top has a removable cover part 24 which is otherwise sealed against the interior of the remaining filter housing 22 by another gasket 26. The essentially cylindrical filter housing 22 tapers downward, as viewed in FIG. 1. In the area of this taper 28, housing 22 has a fluid connection 30 connected to the interior of the filter element 10 to carry fluid via the mounting connection piece 18. The longitudinal axis 32 of the fluid connection 30 extends at a right angle to the longitudinal alignment or longitudinal axis 34 of the filter housing 22. Another fluid connection 36 with a longitudinal axis 38 is located on top of fluid connection 30 and is likewise perpendicular to the longitudinal axis 34 of the filter housing 22. The diameters of the two fluid connections 32, 36 correspond or are equal to each other, with the fluid connection 30 forming the fluid outlet and the fluid connection 36 forming the fluid inlet of the filter device. The dirty fluid flows via the fluid inlet 36 into the interior of the filter housing 22 and from there flows from the outside to the inside through the filter element 10 with its filter mat 12. Any dirt in the fluid flow, especially in the form of solid particles, adheres to the filter mat 12. The cleaned fluid travels via the interior of the filter element 10 and the mounting connection piece 18 to the side of the fluid connection 30 and accordingly to the outlet side of the filter device.

The two fluid connections 30, 36 can be connected to a fluid means or container, especially in the form of a hydraulic tank 40. In the figures, of the hydraulic tank 40, only one part in the form of the front connecting plate 42 is shown. By a connecting device 44, the unit of the filter housing 22 and the filter element 10 can be coupled to the fluid means, preferably in the form of a hydraulic tank 40, and detached again. The connecting device 44 is provided with a blocking part 46 which can be displaced or can slide tranlationally in the longitudinal direction, and is located between and accessible from exterior surfaces of the filter housing and the fluid means. Blocking part 46, in the blocking position (compare FIGS. 1 and 3A and B), blocks the fluid connections 30, 36, and after moving into the open position (compare FIGS. 2 and 3C) clears these fluid connections 30, 36.

The blocking part 46 is a plate-shaped sliding valve part which is guided sealed between the front connecting plate 42 and another or back connecting plate 48 of the connecting device 44 by a sealing device 50. As already described, one connecting plate 42 is facing the fluid means or the tank 40, and the other, second connecting plate 48 faces the unit of the filter housing 22 and the filter element 10. Both the sliding valve part and the two connecting plates 42, 48 are essentially rectangular. The sealing means 50 includes a conventional ring seal between the connecting plates 42, 48 and the sliding valve part. The sliding valve part is guided in between in the middle as a blocking part 46. The sealing device 50 extends annularly around the fluid passages 52, 54 extending in the two connecting plates 42, 48 and having longitudinal axes coaxial to the longitudinal axes 32, 38 of the fluid connections 30 and 36, respectively. FIG. 1 illustrates the blocking position of the blocking part 46 with fluid passages 52, 54 covered by the wall parts 56 of the blocking part. The fluid passages are kept cleared in the open position shown in FIG. 2.

The two fluid connections 30, 36 of the filter housing 22 are oriented in the longitudinal direction of the latter, one on top of the other in the same manner as the fluid passages 52, 54 in the connecting plates 42, 48 of the connecting device 44. Between the blocking wall parts 56 of the blocking part 46, the blocking part has clearance openings 58 which are cylindrical and which in the open position of the blocking part 46 (compare FIG. 2) are congruent with the fluid passages 52, 54 of the connecting device 44 so as to carry fluid. In this open position, the longitudinal axes of the holes of the respective connections extend in a line or are coaxial so that no unnecessary edges are formed which could possibly lead to cavitation or swirling. Holes for fluid passage discharge are in a common plane, relative to the outside contour of the filter housing 22 and to the outside contour of the connecting device 44. The two fluid connections 30, 36 of the filter housing 22 are each provided with one valve 60, 62, respectively. The valve disk of one valve 60 located on the fluid outlet 30 projects over the outlet 30 to the outside. The valve disk of valve 62 is located at the fluid inlet 36, and is integrated into it. Each respective valve disk opens as shown against the action of the resetting force or biasing of a compression spring, and has a convex arch pointed against the direction of flow of the fluid to be triggered.

Figure 2:
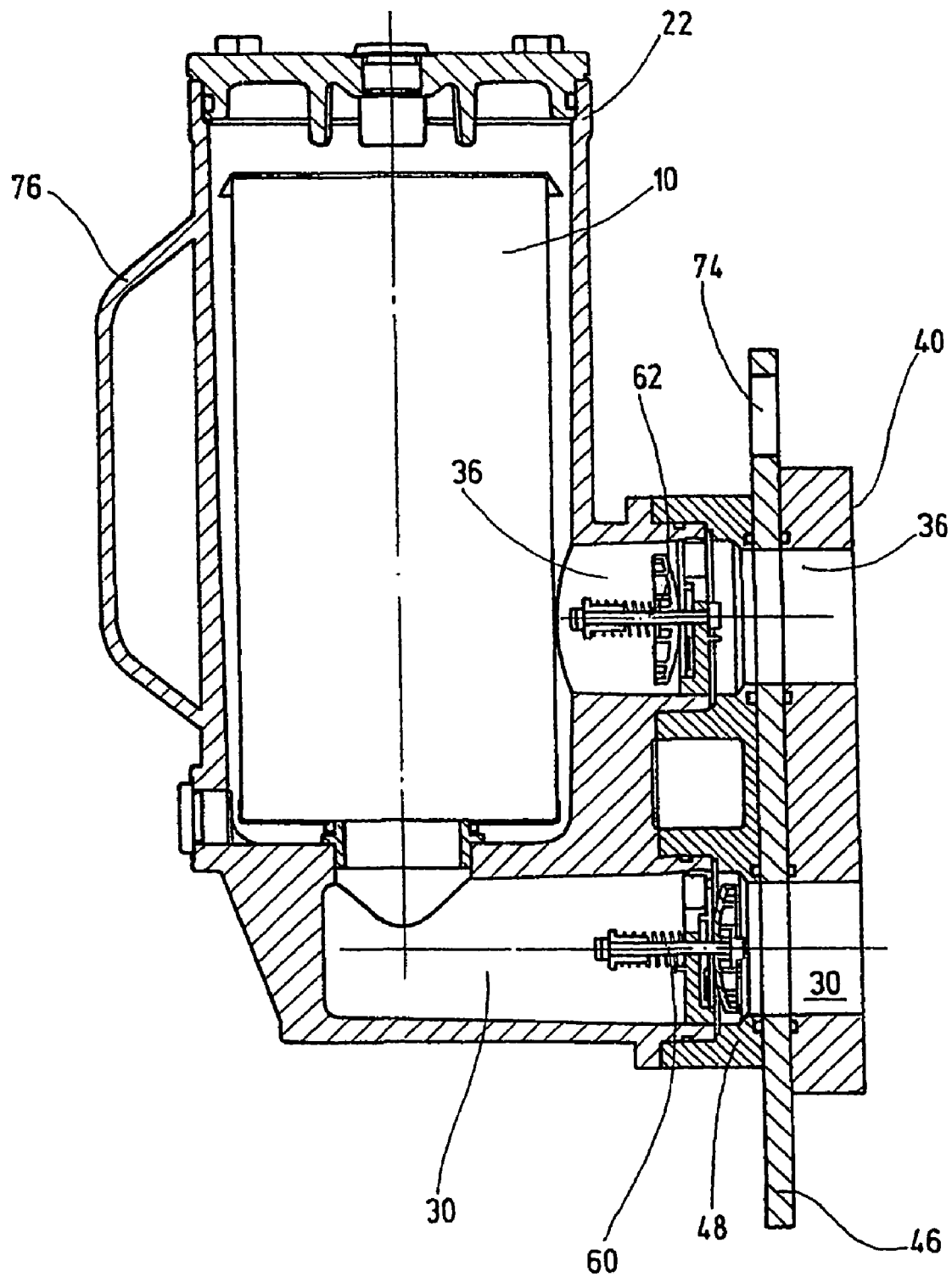
FIG. 2 is a side elevational view in section of the filter device of FIG. 1, in the assembled state.
Figures 3A, 3B, 3C:
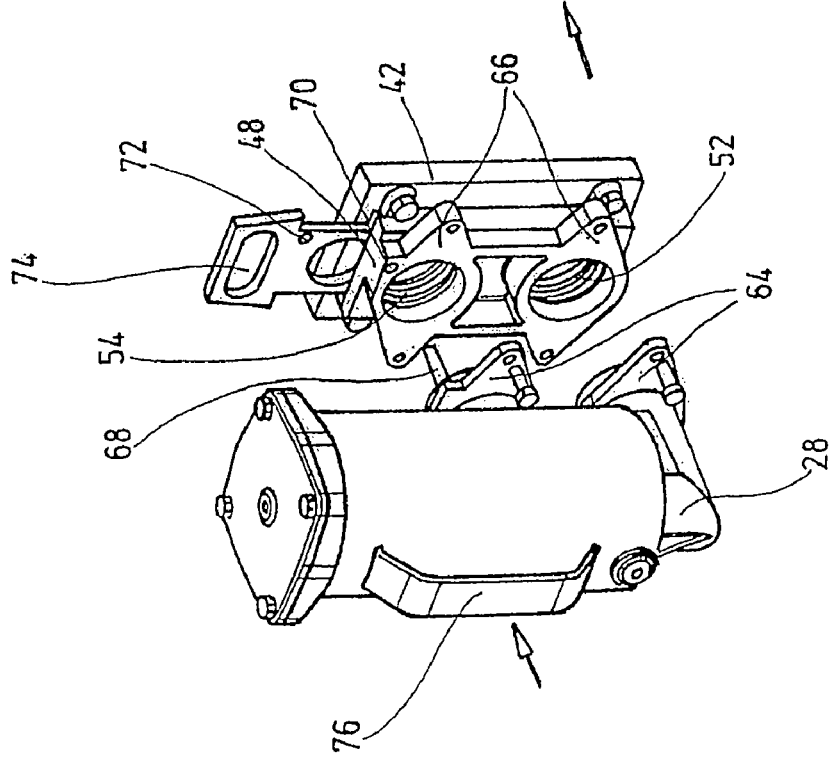
FIGS. 3A-3C are perspective views of the filter device of FIGS. 1 and 2, with FIG. 3A showing the filter housing separated from the fluid means, FIG. 3B showing the filter device assembled and blocked, and FIG. 3C showing the filter device assembled and open.

The fluid connections 30, 36 of the filter housing 22 are surrounded on the outer peripheral side by flange-like attachment parts 64. These attachment parts 64 are used to attach the filter housing 22 to the flange parts 66 of the facing connecting plate 48. The flange parts encompass the fluid connections 53, 54. The filter housing 22 with the filter element 10 can be attached stationary to the connecting device 44 and accordingly to the fluid means in the form of a hydraulic tank 40 by a conventional screw connection. As viewed in FIG. 3A, the upper attachment part 64 has a locking part in the form of a locking pin 68. For passage or receipt of this locking pin 68, the connecting plate 48 has a through hole 70 which can be made congruent with a recess 72 in the blocking part 46, as soon as the unit is attached to the connecting device 44 and the sliding valve-shaped blocking part 46 has assumed its open position as shown in FIG. 2 and FIG. 3C. In this way, a plausibility check is achieved and operating errors are for the most part precluded, since the unit of the filter housing 22 and the filter element 10 can only be attached when the locking pin 68 has engaged the recess 72 from its free end on the front side. The screws of the attachment parts 64 and the flange parts 66 are tightened to complete the attachment process. This catching engagement of the locking pin 68 results in the sliding valve-like blocking part 46 not unintentionally traveling into its closed position as shown in FIG. 1.

The blocking part 46, viewed in the figures on its top, has a handle 74 having a through hole into which the operator can fit his hand accordingly. The filter housing 22 on its side facing away from the connecting device 44 has another handle 76 in the form of a knuckle bow via which the unit of the filter housing 22 and the filter element 10 can be easily handled by the operator. The filter housing 22 itself is preferably of an aluminum diecasting. The blocking part 46 can be of a steel or plastic material.

With reference to FIGS. 3A-C, the important operating sequence is described with reference to the filter device of the present invention.

As viewed in FIG. 3A, the blocking part 46 is in its upper blocking position, as also shown in FIG. 1. In this blocking position, the continuous wall sections 56 cover the fluid passages 52, 54. On the sides of the fluid means 40 in the form of the hydraulic tank, an operating overpressure of for example 10 bar is to prevail. As a result of the spring force support, the valves 60, 62 are closed. The filter housing 22 should have a new, unused filter element 10 with the formation of a new unit. According to FIG. 3B, an intermediate position is shown there in which the screws of the attachment parts 64 and the flange parts 66 already engage each other, and the locking pin 68 has already penetrated the hole 70 in the connecting plate 48. The pin free end adjoins the top of the plate-shaped blocking part 46. At this point the blocking part 46 is moved farther down and then assumes its open position of FIG. 3C. Since the handle 74 is provided with stop shoulders at the location of the transition to the recess 72, the stop shoulders are positioned on the respective parts at the top on the connecting plate 48 so that the blocking part 46 is prevented from being able to slip down out of the guide formed between the two connecting plates 42, 48. The recess 72 is now positioned such that the locking pin 68 engages as soon as the screw connections are definitively fixed. This operating or open position is reproduced according to the sectional view in FIG. 2. Based on the prevailing fluid pressure on the sides of the fluid means 40, the valve 62 which is uppermost in FIG. 2 is pushed open, and dirty fluid can enter the filter device for a cleaning process through the filter element 10. The cleaned fluid then leaves the filter housing 22 via the other, second valve 60 which opens by the valve disk being pressed in the direction of the fluid passage 52.

For a decoupling process of the unit from the connecting device 44, the indicated attachment processes proceed in the reverse sequence. The sliding valve-shaped blocking part 46 closes the fluid means 40. The valves 60, 62 reliably close the filter housing 22 with its contents relative to the exterior. The used filter element 10 can now be cleaned at another suitable location or optionally can be replaced by a new element. Since the fluid means is blocked against the exterior by the blocking part 46, oil cannot escape from the system to the exterior. In another execution of the solution of the present invention, it is also conceivable to decouple the fluid means from the unit and consequently from the filter housing 22 by the blocking part 46, on site, but, that is to say, directly on the equipment, to replace the element after loosening the cover part 24. In place of only one blocking part 46, several blocking parts or sliding valves can also be assigned to each fluid opening and can assume the blocking function. In this respect it is not necessary to shut down the hydraulic system for a replacement or maintenance process.

While one embodiment has been chosen to illustrate the invention, it will be understood by those skilled in the art that various changes and modifications can be made therein without departing from the scope of the invention as defined in the appended claims.

What is claimed is:

1. A filter device, comprising:
a filter housing having first and second fluid connections and an exterior surface;
a filter element held in said filter housing;
a fluid container having an exterior surface and being located adjacent to and side-by-side with said filter housing to define a lateral space therebetween; and
a connector coupling said fluid connections to said fluid container, said connector having at least one longitudinally displaceable blocking part blocking said fluid connections in a blocking position thereof and opening said fluid connections in an open position thereof, said blocking part being located between and accessible from said exterior surfaces of said filter housing and said fluid container when said filter housing and said fluid container are coupled by said connector, said blocking part including a plate-shaped sliding valve part guided for movement between and sealed between first and second connecting plates of said connector by seals facing said filter housing and facing said fluid container, said connector with said blocking part being located in said lateral space with said filter housing and said fluid container being on opposite sides of said connector.

2. A filter device according to claim 1 wherein
said fluid container comprises a hydraulic tank.

3. A filter device according to claim 1 wherein
said fluid connections comprise a fluid inlet and a fluid outlet in said filter housing;
said connecting plates comprise fluid passages corresponding to and forming part of said fluid connections; and
said blocking part has wall parts that cover said fluid connections in the blocking position and has openings that clear said fluid connections in the open position.

4. A filter device according to claim 3 wherein
said fluid inlet and said fluid outlet are located one of top of another in a direction of a longitudinal axis of said filter housing, and are adjacent one another and open directly on said exterior surface of said filter housing;
said fluid passages are located one on top of another in said direction of said longitudinal axis and are adjacent one another; and
said blocking part has clearance openings between said wall parts, said clearance openings being aligned and congruent with said fluid passages in the open position to convey fluid therethrough.

5. A filter device according to claim 1 wherein
said first and second fluid connection has first and second valves, respectively.

6. A filter device according to claim 5 wherein
said first fluid connection comprises a fluid outlet of said filter housing, with said first valve having a valve disk located on an outside of and over said fluid outlet and being independent of said blocking part; and
said fluid connection comprises a fluid inlet of said filter housing, with said second valve having a valve disk integrated within said filter inlet and being independent of said blocking part.

7. A filter device according to claim 1 wherein
said filter connections of said filter housing are encompassed on an outer peripheral side thereof by an attachment part; and
said connector has flange parts on a connecting plate thereof facing said attachment part, said connecting plate having fluid passages therein encompassed by said flange parts.

8. A filter device according to claim 7 wherein
said attachment part comprises a locking part received in an opening in one of said flange parts and in a recess in said blocking part in the open position, said locking part, said opening and said recess extending transversely to a movement direction of said blocking part.

9. A filter device according to claim 8 wherein
said locking device comprises a locking pin.

10. A filter device according to claim 1 wherein
said filter housing comprises a handle for manual operation thereof; and
said blocking part comprises a handle for manual operation thereof.

11. A filter device according to claim 1 wherein
said filter housing comprises cast aluminum; and
said blocking part comprises one of steel and plastic.

12. A filter device according to claim 1 wherein
said blocking plate moves translationally between the blocking and open positions.

13. A filter device according to claim 1 wherein
said fluid connections extend perpendicular to a longitudinal axis of said filter housing.

14. A filter device according to claim 1 wherein
said blocking part has two openings and two wall parts.

15. A filter device according to claim 14 wherein
said two openings and said two wall parts are fixedly connected for simultaneous movement thereof only.

* * * * *